June 22, 1965

R. D. RUMSEY ETAL 3,190,634

HYDRAULIC BUFFER

Filed March 1, 1965

INVENTORS
ROLLIN DOUGLAS RUMSEY
ANDREY L. ZANOW
BY
Hill, Sherman, Meroni, Gross & Simpson
ATTORNEYS

United States Patent Office 3,190,634
Patented June 22, 1965

3,190,634
HYDRAULIC BUFFER
Rollin Douglas Rumsey, Buffalo, N.Y., and Andrey L. Zanow, Cleveland, Ohio; said Rumsey assignor to Houdaille Industries, Inc., Buffalo, N.Y., a corporation of Michigan
Filed Mar. 1, 1965, Ser. No. 438,460
20 Claims. (Cl. 267—1)

This invention relates to hydraulic shock absorbing buffers, and more particularly to such buffers capable of absorbing high loads under adverse environmental conditions, such as in railway car "sliding sill" construction.

The present application is a continuation-in-part of our copending joint applications Serial No. 157,981 filed December 8, 1961 and Serial No. 225,976 filed September 24, 1962 and now abandoned and of the copending Zanow application Serial No. 241,285 filed November 30, 1962 and now abandoned.

As pointed out in our copending applications, in various environments and conditions of use shock absorbing devices, especially of the heavy duty type, must survive long periods of inactivity and still provide reliable operation. During inactive periods, such a buffer can become smothered in paint or dirt. Further, high capacity in proportion to size is a criterion in respect to the buffers for use in numerous instances such as in aircraft, missiles, and the like, since weight and space are at a premium. It is also highly desirable to afford a hydraulic shock absorbing buffer which will function reliably under conditions where maintenance is haphazard or even omitted.

An important object of the present invention is to provide a new and improved hydraulic shock absorbing buffer capable of long life and high loads under adverse environmental conditions.

Another object of the invention is to provide an improved hydraulic shock absorbing buffer wherein smooth, accurate longitudinal working surfaces are thoroughly protected from contamination and against damage from external forces or objects.

Still another object of the invention is to provide an improved hydraulic buffer construction embodying a novel rugged, simple, efficient piston assembly.

Yet another object of the invention is to provide in a hydraulic buffer assembly a new and improved housing and cylinder construction.

A further important object of the invention is to provide long-travel heavy-duty buffing devices in which the radial support of an assembly movable within the device comprising its piston and the piston rod therefor is obtained primarily at two longitudinally spaced points to thereby achieve substantial economies in manufacturing without sacrifice of performance or maintenance economy.

A still further object is to provide buffing devices in accordance with the foregoing object which are inherently free of oil leakage.

Still another object is to provide a buffing device which is of open construction between the piston and the seal for the piston rod thereof while also providing effective recoil snubbing.

Broadly speaking, this invention resides in a hydraulic buffer for railway vehicles, or the like, but also suitable for other heavy duty uses as mentioned, comprising a cylinder having an open rear end and a front end substantially enclosed by a cylinder head or wall; a piston reciprocable within the cylinder with a piston rod therefor extending rearwardly through and beyond the open cylinder end; a cylinder extension, preferably of smaller internal diameter than the cylinder, normally joining with the cylinder adjacent its open end, and extending rearwardly in coaxial relation with both the cylinder and the rod; an annular sealing medium surrounding the piston rod and secured thereto in fixed longitudinal relationship to tightly engage the full circumference of the inner surface of the cylinder extension and be carried lengthwise thereof by the rod; a reservoir normally constructed around the cylinder and the head thereof and connected with the cylinder for the exchange of liquid for receiving and discharging liquid in accordance with decreases and increases in the volume of the cylinder and the space between the rear of the piston and the sealing medium. Finally, the buffer includes appropriate duct system for the transfer of liquid between the space rearward of the piston and the liquid storage region provided by the cylinder and the reservoir since increases and decreases in the volume of this space occur in the operation of the buffer.

The invention further includes structure for returning liquid leaking by a portion of the piston rod seal to a region contiguous with the interior of the cylinder.

Other objects, features and advantages of the present invention will be readily apparent from the following detailed description of a preferred embodiment thereof taken in conjunction with the accompanying drawings, in which:

Figures 1, 7:
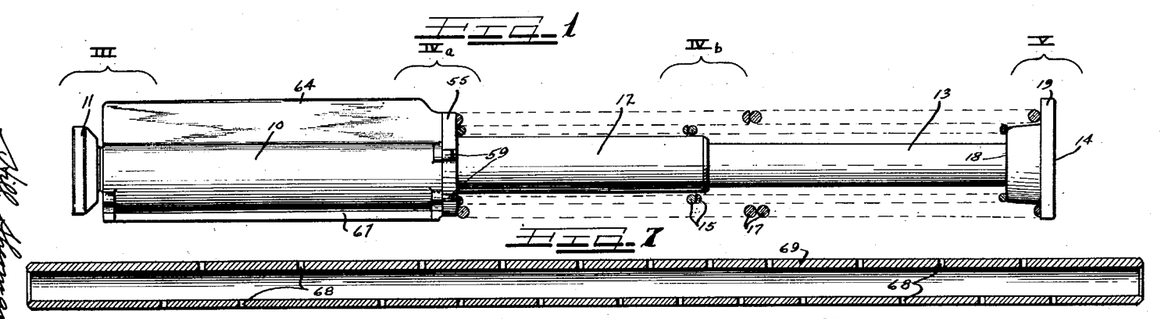
FIGURE 1 is a side elevational view of a hydraulic shock absorbing buffer according to the present invention.
FIGURE 7 is a longitudinal sectional view through the metering tube of the buffer.
Figure 2:
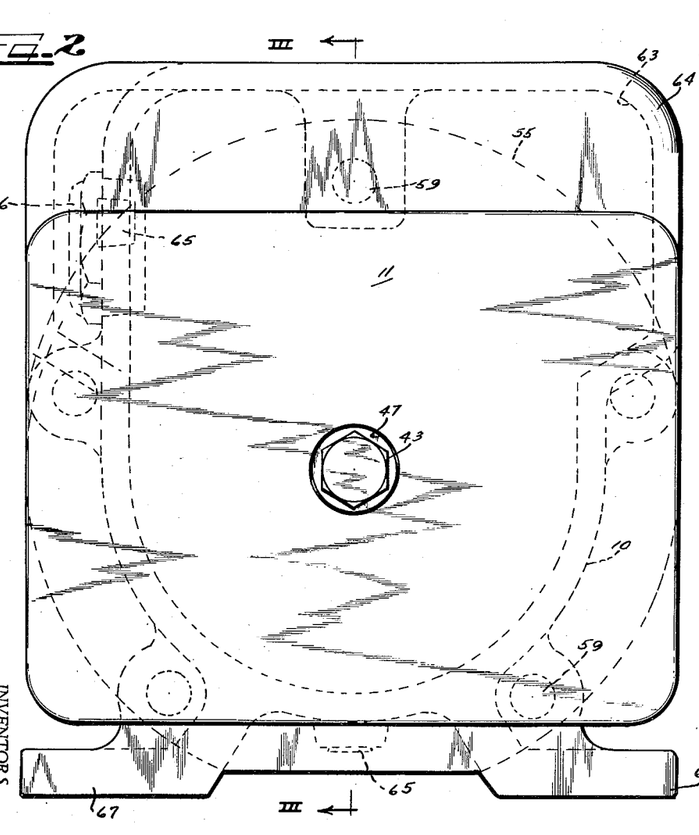
FIGURE 2 is an enlarged elevational view of the left end of the buffer shown in FIGURE 1.

A hydraulic shock absorbing buffer as depicted in FIGURE 1 is constructed and arranged for use in a substantially horizontal position and to provide for a substantial range of shock absorbing travel of the active components. To this end, the buffer includes an elongated main body or housing 10 carrying on one end a buffer head or follower 11. Projecting fixedly from the opposite end of the housing 10 is a tubular cylinder extension 12 through which extends reciprocably a long piston rod 13 carrying on its outer end or distal extremity a buffer follower 14 facing opposite to the follower 11.

Normally maintaining the housing 10 and the piston rod 13 projected to maximum extent, affording mechanical shock absorption and damping supplemental to hydraulic shock absorption and damping within the housing 10, serving as centering means and preventing binding of the relatively telescoping components of the unit under heavy buffing and impact loads, and further providing a protective shield about the encompassed parts, are an inner helical coil spring structure 15 and concentrically thereabout outer helical coil spring structure 17. For maximum centering value with minimum tendency to buckle and efficiency in shock absorbing function within the relatively long stroke range of operation of the buffer unit, the spring structures 15 and 17 are constructed to provide tandem assemblies of a plurality of springs in each structure. In a practical arrangement, each of the spring structures 15 and 17 includes a pair of springs. In one of the spring structures the respective springs are of different lengths relative to the pair of springs of the other of the spring structures so as to avoid a coterminous relation of the abutting ends of the tandem springs of the two sets, whereby the telescopically disposed sets of springs are mutually supportive against transverse displacement of the abutting ends in each of the spring structures 15 and 17. Further, in order to prevent interlocking during compression, the springs 15 and 17 are coiled in opposite directions. For example where the inner springs 15 are coiled right-hand, the outer springs 17 are coiled left-hand. Dynamic balance is also improved by having the inner springs of smaller gauge or diameter wire than the outer springs 17. In a practical form it has been found that desirable results are attained where the outer spring wire stock is about one-third greater diameter than the diameter of the wire sock of the inner springs 15. For mutual diametrical support, the outside diameter of the coils of the inner springs 15 is in free sliding complementary relation to the inside diameter of the coils of the outer springs 17.

Binding and bending of the buffer unit is further obviated by free swivelling mounting of the follower 14 concentrically on the end of the piston rod 13 (FIG. 5) and thrusting of the adjacent ends of the springs 15 and 17 against this follower while the opposite ends of the spring assemblies thrust against fixed abutment afforded on the adjacent end of the housing 10. To this end, the follower 14 is of sufficiently larger diameter than the piston rod 13 to provide at its inner end an inner spring abutment shoulder 18 and a larger diameter outwardly offset outer spring abutment flange 19. Connection of the follower 14 to the adjacent end of the piston rod 13 is effected in a manner to maintain the springs 15 and 17 under at least slight compression in the fully projected condition of the buffer unit with a convex bearing end surface 20 on the piston rod engaging a complementary concave swivel bearing surface 21 formed coaxially in the inner end of the follower 14.

Figure 5:
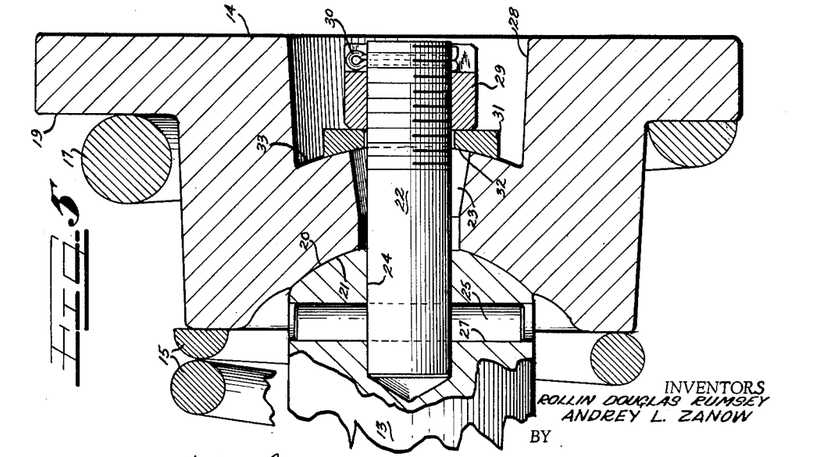
FIGURE 5 is a similar sectional view depicting structure within the terminal length of the buffer unit substantially as indicated by the bracket V of FIGURE 1.

Means effecting detachable swivelling connection of the follower 14 to the piston rod 13 comprise a connecting stud 22 extending through a swivel-clearing axial bore 23 of larger diameter through the follower 14. Attachment of the stud 22 to the piston rod 13 is suitably effected as by reception of the inner end portion of the stud within a complementary endwise opening blind end bore 24 in the adjacent end of the piston rod wherein the stud is secured as by means of a cross pin 25 extending in press fit relation through a cross bore 27 and through the engaged end portion of the stud.

An outer threaded end portion of the stud 22 is accommodated within a clearance recess 28 in the outer abutment face of the follower 14 with a slotted end or castellated nut 29 secured on the stud, held in place against accidental displacement by a cotter pin 30, and bearing against a thrust washer 31 having a concave bearing face 32 thrusting against a complementary convex bearing surface 33 defining the inner end or bottom of the recess 28. Through this arrangement, free swivelling movement of the follower 14 is enabled within ample operating limits.

At the opposite end of the buffer unit, the follower 11 is also mounted for limited though adequate operational swivelling relative to the housing 10. To this end, the follower 11 has on its inner face a central concave recess providing a bearing surface 34 thrusting in swivelling relation against a complementary convex bearing head surface 35 on a thrust head member 37 (FIG. 3) having a centering stem boss 38 projecting inwardly therefrom and engaged in a complementary bore 39 formed axially in a head end portion 40 otherwise integrally closing the adjacent end of the housing 10. Attachment of the thrust member 37 to the head 40 is effected as by means of screws 41 and since the member 37 provides a closure plug for the bore 39, suitable fluid sealing ring means 42 are provided in the joint between the members.

Figure 3:
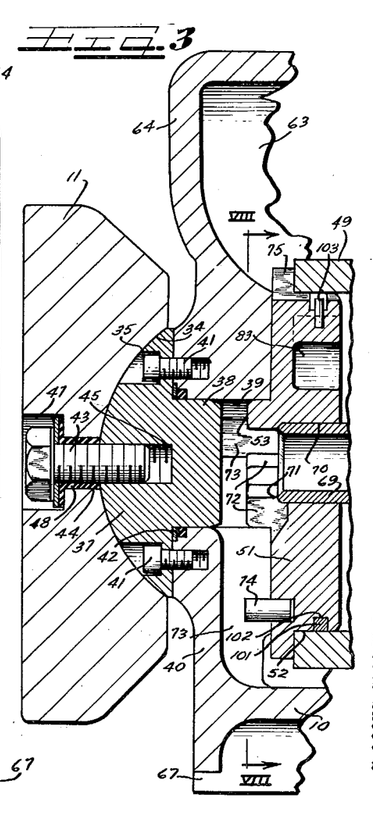
FIGURE 3 is a fragmentary sectional elevational view taken substantially on the line III—III of FIGURE 2 and comprising substantially the length of the buffer unit indicated by the bracket III in FIGURE 1.

Swivelling attachment of the follower 11 to the thrust member 37 is effected as by means of a bolt 43 the shank of which extends through a swivel clearance axial bore 44 in the follower member and is secured threadedly into a threaded outwardly opening central counterbore 45 in the thrust member. In order to countersink the head of the bolt 43 within the outer abutment face of the follower 11 a central counterbore 47 is provided in such face. Means for normally centering the follower 11 comprise a resiliently yieldable flanged rubber bushing 48 which surrounds the bolt 43 within the bore 44 of the follower and underlies the head of the bolt within the counterbore 47.

Figure 4:
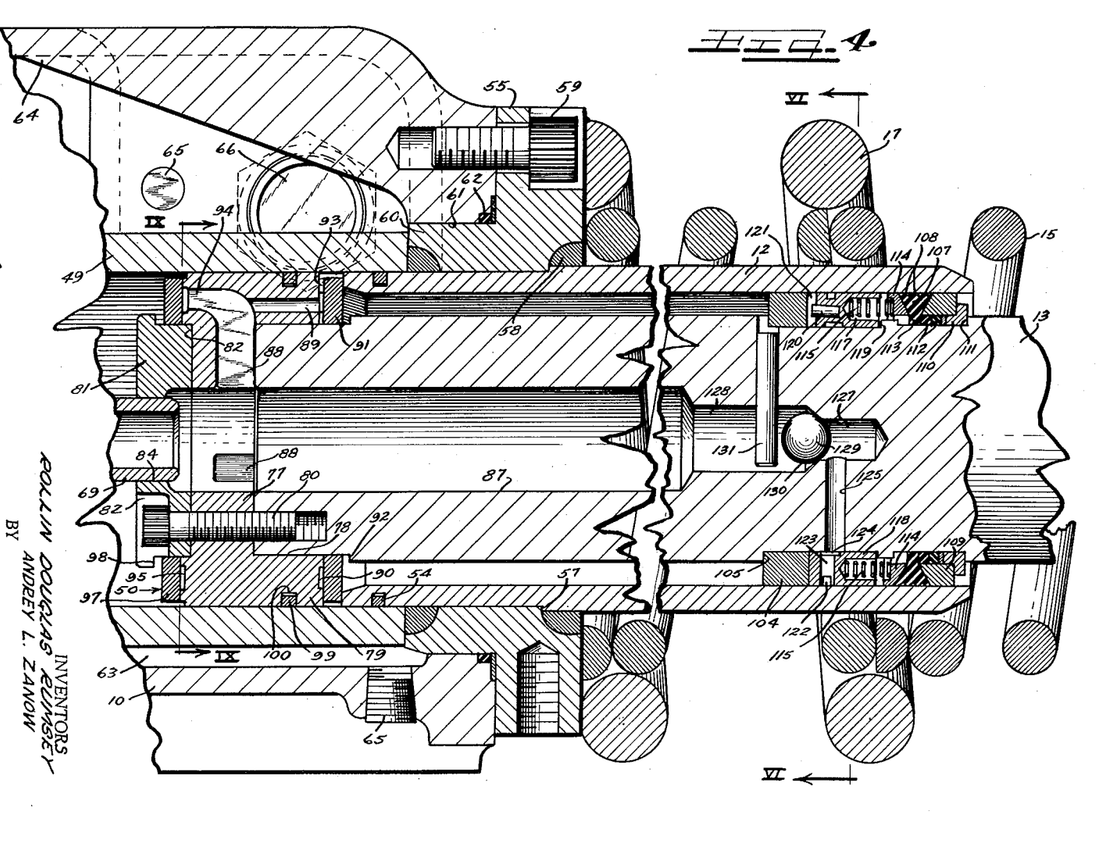
FIGURE 4 is a fragmental sectional elevational view through the buffer taken in substantially the same plane as FIGURE 3 but depicting the structure within substantially those portions of the length of the unit indicated by the brackets IVa and IVb of FIGURE 1.

Within the housing 10, hydraulic cylinder and piston means are so thoroughly enclosed as to preclude contamination by dirt or other foreign matter externally of the buffer unit, and further, thoroughly protected against damage from external forces and supported against working load stresses by the rugged housing. In an economical construction minimizing machining and more particularly fine, close tolerance machining of working surfaces, a separate tubular working cylinder 49 is provided (FIGS. 3 and 4) of a length to extend substantially throughout the interior length of the housing 10. By affording a substantial wall thickness and having the cylinder tube 49 free from holes or notches throughout its entire length it has maximum stress carrying capability. Further, the only surface of the cylinder tube 49 requiring close tolerance finishing is the inner cylinder surface which may be honed for close sliding fit of a complementary highly finished cylindrical surface of a piston 50 carried by the inner end of the piston rod 13.

Mounting of the cylinder 49 concentrically within the housing 10 is effected at the head end of the assembly by means of a locating flange member 51 which provides an end closure for the cylinder and has a peripheral rabbet groove 52 within which the associated end portion of the cylinder tube is fitted. Concentric location of the flange member 51 on the inner side of the housing head portion 40 is maintained by outwardly projecting central boss structure 53 fitted into the inner end of the bore 39 of the housing head.

At its opposite end, the cylinder tube 49 is located adjacent to but spaced a limited distance inwardly from the adjacent end of the housing 10 (FIG. 4) and is supported concentrically by the inner end portion of the cylinder extension 12 telescoped to a short extent into the working cylinder, a high pressure seal being afforded in the telescoped joint as by means of a piston ring 54. This cylinder assembly is rigidly secured to the adjacent end of the housing 10 by means of an attachment flange member 55 of rugged construction encircling and seating on the extension cylinder 12 adjacent to the telescopic end portion and abutting a locating shoulder 57 provided on the outer perimeter of the cylinder 12. Permanent and completely fluid sealed attachment of the attachment and centering flange 55 to the cylinder 12 is effected as by means of axially spaced concentric annular welds 58.

Attachment of the flange member 55 to the adjacent end of the housing 10 is effected by means such as suitable screws 59 with a centering boss portion 60 of the flange fitting within a concentric bore 61 in the end of the housing. A suitable annular seal structure 62 in the joint between the housing and the flange member 55 prevents leakage of fluid from within the housing. It will be observed that the inner end of the centering boss 60 thrusts against the adjacent end of the working cylinder 49 whereby the working cylinder is thrust axially toward the locating flange 51 at its opposite end and thrusts the locating flange into firm centered seating engagement with the housing head portion 40. It may also be observed that strain is minimized on the attachment screws 59 because the compression springs 15 and 17 thrust actively against the opposing shoulder provided therefor by the flange member 55. Hence, under the conditions of highest pressure developing within the hydraulic system in the housing 10 during inward working stroke of the piston 50 in operation, thrust of the springs 15 and 17 is also under the greatest force and thus compensates for hydraulic pressure forces within the housing working on the cylinder 49 and against the flange member 55.

Within the cylinder 49 a filled hydraulic system is maintained, suitable hydraulic fluid such as a substantially non-viscous oil being supplied to maintain the cylinder full from a reservoir 63 within the housing 10 preferably surrounding the cylinder and also occupying a substantially enlarged space within an upwardly projecting longitudinal reservoir enlargement 64 on the housing. The capacity of the reservoir 63 is sufficient for continuous replenishment of the working cylinder and to receive hydraulic fluid displaced from the working cylinder during working strokes of the piston 50. Suitable plugs 65 close filler openings through the reservoir envelope provided by the housing 10. An oil sight gauge or window 66 is desirably provided in the side of the reservoir enlargement 64.

In service the buffer unit is mounted with the reservoir enlargement 64 disposed upwardly while longitudinal base flanges 67 on the lower side of the housing 10 support the unit between relatively movable parts of the apparatus or gear with which the followers 11 and 14 are in buffer, shock absorbing load relationship. During shock absorbing thrust of the followers 11 and 14 toward one another, corresponding telescopic movement of the housing 10 and the piston rod 13 occurs and the piston 50 is driven from a normal position adjacent the inner or extension cylinder end of the cylinder and housing assembly toward the head end of the working cylinder 49. During such action high shock absorbing hydraulic pressure is developed in the working cylinder accompanied by metering of the hydraulic fluid from the working cylinder into the reservoir 63. For this purpose, there is a metering tube 69 (FIGS. 3, 4 and 7) which is of substantially smaller diameter than and is fixedly mounted concentrically within the working cylinder 49 and is coactive with the piston 50. Fixed mounting of the metering tube 69 is effected by securing one end portion thereof within a central bore 70 in the locating attachment flange member 51, permanence of the tube attachment being assured by means such as tack welds 71 (FIGS. 3 and 8).

Free and as reasonably unobstructed fluid passage between the interior of the metering tube 69 and the reservoir 63 through the anchored end of the tube is afforded by way of a plurality, herein three, relatively large cross-sectional flow area radial passage slots 72 through the centering boss structure 53, and a clearance space between the boss structure and the centering boss 38 opening into a plurality, herein three, relatively large aggregate cross-sectional flow area radial passage grooves 73 provided in the inner face of the end closure 40 and communicating between the bore 39 and the reservoir 63. Registration of the slots 72 with the passage grooves 73 is assured in the assembly by a registration pin 74 projecting from the outer face of the attachment flange 51 and registering within one of the passage grooves 73.

Orientation of the attachment flange 51 through the medium of the registration pin 74 is also useful in assuring location of an air purging small cross-sectional flow area groove 75 in the upper edge of the flange member 51 with the reservoir space in the upper enlargement 64 of the housing. This groove 75 assures purging of all air from within the working cylinder 49, but passes such a small volume of hydraulic fluid during a working stroke of the piston 50 as to avoid any interference with or material reduction in shock absorbing pressure within the cylinder and merely supplements metering of hydraulic fluid between the working cylinder and the reservoir with the principal metering of an exchange of hydraulic fluid between the working cylinder and the reservoir being through the metering tube 69.

For metering purposes, the tube 69 is provided along its length with two opposed but staggered series of metering orifices 68 which are of a size and number and located in such orientation and spaced relationship as will afford the preferred operating characteristics of the device. During a telescopic shock absorbing stroke of the piston 50 the arrangement is such that the orifices 68 are progressively closed as the piston moves along the metering tube 69 whereby the displacement flow of hydraulic fluid through the tube into the reservoir gradually diminishes and resistance to the telescopic shock absorbing stroke of the piston becomes progressively greater. This may occur according to a square law relationship or according to any other preferred pressure curve which may show a progressive build-up of working force, a relatively constant working force as the velocity decreases, and the like, as predetermined by the size and location of the orifices 68.

Figure 9:
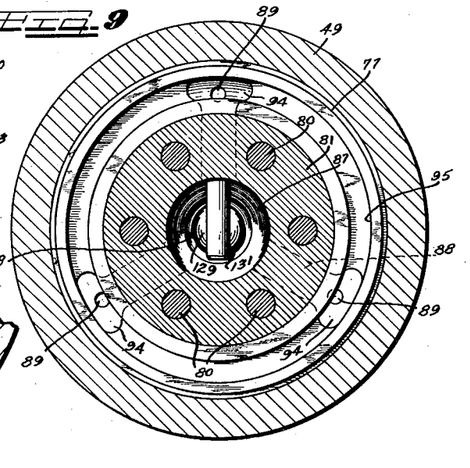
FIGURE 9 is a transverse sectional detail view taken substantially on the line IX—IX of FIGURE 4.

In addition to the means for metering hydraulic fluid from the working cylinder into the reservoir in response to closing, high pressure working stroke shock absorbing action of the piston 50, means are here afforded for metering hydraulic fluid into an area in back of or on the rod side of the piston head. In a desirable construction to this end, the piston 50 comprises as its major component a piston head or body 77 (FIGS. 4 and 9) desirably of one piece structure and of generally cup-shape cylindrical configuration with a smoothly, accurately cylindrically finished external cylindrical wall of substantial length slidably opposing the cylindrical surface of the working cylinder portion 49 of the buffer unit. Juncture of the piston head 77 with the end of the piston rod 13 is effected by fitting the inner end portion of the rod into a central complementary recess or cavity 78 in the back side of the piston head defined by a substantial annular rearwardly projecting flange portion 79. Removable attachment of the piston head 77 to the end of the piston rod 13 is effected by suitable means such as a plurality of axially extending screws 80.

For metering coaction with the metering tube 69 which extends fixedly from the head end of the housing 10 and the cylinder 49, the piston head 77 is preferably equipped with a separately formed and attached combination retaining plate and metering tube engaging bearing ring member 81. This member is of smaller diameter than and seated concentrically on the front or cylinder working chamber side or face of the piston head 77 within a complementary seating and centering recess 82. Attachment of the retainer and bearing member 81 to the end of the piston rod 13 in common with and in clamping relation to the piston head 77 is by means of the screws 80, the heads of which are accommodated in respective forwardly and radially outwardly opening recesses 82. This accommodation of the screw heads back of the front face of the member 81 minimizes hydraulic fluid turbulence from the screw heads during inward working stroke of the piston 50, facilitates movement of the hydraulic fluid past the member 81 toward the front or high pressure working face of the piston head 77, and further coacts with a plurality of inwardly opening recesses 83 (FIG. 3) in the locating and attachment head flange 51 to prevent sticking should the inner face of the member 81 at any time contact the inner face of the member 51.

Bearing, metering engagement of the member 81 of the piston assembly with the outside diameter of the metering tube 69 is effected by an internal concentric complementary cylindrical bearing surface 84 providing a central bore coaxially aligned with a larger diameter central clearance bore 85 through the piston head 77 which in turn is aligned with a concentric preferably substantially similar diameter metering rod receiving and clearance bore 87 opening through the inner end of the piston rod and extending to a length which will receive the metering tube 69 in the maximum closing or inward limit of telescoping of the piston 50 within the working cylinder 49.

Metering of hydraulic fluid during a telescoping or closing stroke of the piston into an area back of the piston head 77 afforded by smaller diameter of the piston rod 13 than the outside diameter of the piston head and the diameter of the working cylinder 49 is afforded by metering passage means through the piston head. For this purpose, the piston head 77 is provided with a plurality of individually large cross-sectional flow area radial passages 88, desirably three in number equidistantly spaced, opening through the central bore 85 of the piston head. Communicating with the passages 88 are respective metering orifices 89 extending axially through the flange portion 79 of the piston head and opening through the back face of the flange into an annular groove 90. During the inward stroke of the piston 50, hydraulic fluid passes freely from the groove 90 into the area back of the piston head 79.

Return stroke damping is effected, though at a lower level than on the power or instroke damping, by closure of the annular groove 90 in the back face of the piston flange 79 by a plate disk valve member 91 axially floatingly accommodated between such end face and an appropriately spaced opposing shoulder 92 on the piston rod 13. During the return stroke, hydraulic fluid trapped within the area back of the piston head 79 forces the disk valve 91 into closing engagement against the piston head back face and displacement of the trapped hydraulic fluid into the groove 90 is substantially limited to and metered through a metering passage provided by a radial groove 93 across the end face of the flange 79 and intersecting the groove 90. During in- or power-stroke of the piston, the ring disk valve 91 is forced away from the piston head to the shoulder 92 and by being of smaller outside diameter then the working cylinder bore permits free displacement thereby of hydraulic fluid entering the area back of the piston head.

During the return stroke of the piston, free return of hydraulic fluid from the reservoir 63 into the working zone between the piston 50 and the locating end closure plate 51 within the working cylinder is through the substantial tubular passage afforded by the metering tube 69, some of the returning fluid passing through the metering orifice 68, but a freer passage being provided from the free end of the metering tube 69 into the chamber provided within the larger diameter bore 87 in the piston rod 13 and thence through the large flow area passages 88 in the piston head 77 which have forwardly directed large flow area passage legs 94 (FIGS. 4 and 9) opening through the inner or front face of the piston head 77 into an annular groove 95 in such face. During such return displacement or replenishment flow of the hydraulic fluid, a ring disk plate valve 97 of substantially the same structure as the similar valve 91 is floatingly displaced from the front face of the piston head about the retainer plate 81 and is limited to a free flow clearance relation to the adjacent piston face by shoulder structure 98 on the member 81 overhanging the valve disk. During instroke or high pressure damping action of the piston 50, the valve disk 97 is closely thrust onto its seat afforded by the piston head 77 and closes the groove 95 against displacement of hydraulic fluid from within the working cylinder chamber so that such working fluid is forced to displace through the metering orifices 68.

For improved hydraulic damping pressure during instroke of the piston 50, the piston head 77 is equipped with a piston ring 99 which engages the finished cylindrical bore of the working cylinder 49 and is accommodated in an annular piston ring groove 100 in the perimeter of the piston head. However, where exceptionally high impact pressures may develop in the working chamber of the cylinder 49, the piston ring 99 may be omitted, so that bulging of the working cylinder under the high internal pressures encountered may act as a relief valve to permit limited pressure escape by flow of hydraulic fluid around the piston head 77. Such high pressure bulging of the cylinder 49 is feasible because throughout its working length in association with the piston, the working cylinder is unopposed externally by any supporting structure, inclusive of the end of the cylinder opposed by the telescopic engagement about the inner end portion of the extension cylinder 12.

For the same purpose, a piston ring 101 (FIG. 3) is mounted in the perimeter of the retaining and cylinder end closure plate member 51, accommodated within an annular piston ring groove 102 in the cylinder-opposing perimeter of the member 51. Split ends of the piston ring 101 are oriented with the air bleed and metering groove 75 by suitable means such as a small orientation pin 103 fastened in the member 51 to project into the groove 102 in line with the bleed and metering groove 75.

Improved resistance to buckling forces is attained by bearing support of the piston rod 13 within the cylinder extension portion 12 spaced a substantial axial distance from the piston assembly 50, the head portion 77 of which provides the other bearing for the piston and rod assembly in respect to the working cylinder 49. For this purpose, a bushing bearing structure 104 (FIG. 4) is mounted about the piston rod 13 and seated on an annular rearwardly facing shoulder 105, at a suitable distance axially from the piston 50 to assure continuous bearing engagement of the bushing with the opposed internal bearing wall bore of the cylinder extension 12 throughout the operative reciprocable travel of the piston relative to the working cylinder 49. Since the extension cylinder 12 is rigidly coaxial with the working cylinder 49 and in a manner due to the telescoped interengagement of the two cylinder portions to substantially assure equalization of bending or buckling stresses, and the piston and piston rod bearings are substantially spaced apart axially in fixed axial relation to one another throughout the range of stroking movements of the piston there is substantial resistance to and counterbalancing of buckling strains and stresses on the piston and piston rod in spite of the overall length of the buffer unit and more particularly of the piston rod 13. Moreover, even in the fully extended condition of the buffer unit, the bearing 104 is fully protected interiorly of the elongated cylinder extension 12 against any external dirt or other contaminants and it always rides a clean, lubricated and smooth surface provided by the bore of the cylinder extension. An incidental benefit of this particular structural relationship is also present in that no direct sliding bearing area need be provided on the piston rod 13, thus substantially saving machining costs and also enabling the piston rod to be made from less expensive material than where it would be required to withstand bearing wear.

Because the bearing 104 serves also as the dynamic closure for the hydraulic fluid chamber space back of the piston 50 between the smaller diameter piston rod 13 and the bore of the extension cylinder 12, a dynamic fluid sealing structure is provided outwardly adjacent to the bearing ring. In a practical construction, a sealing ring 107 is provided which is of generally trapezoidal cross-section with its dynamic sealing face on its greatest width and facing radially outwardly for sliding sealing engagement with the opposing bore of the extension cylinder 12. A series of annular wiper lips 108 facing in the inward direction on the dynamic periphery of the sealing ring 107 assure substantially complete wiping of hydraulic fluid during a compression or inward stroke of the piston. A rubber type material such as a suitable synthetic compound is desirably utilized in the seal member 107.

In the seal structure assembly, means are provided for maintaining the resilient seal member 107 under efficient sealing compression, including at the axially outer side thereof a rigid retainer packing ring 109 having an opposing annular face complementary to the oblique engaged axial side of the sealing ring and of smaller inside diameter than the normal diameter of the piston rod 13. Position of the ring 109 concentrically with the extension cylinder 12 and the piston rod 13 is maintained by a split retainer ring 110 of generally L-shaped cross-section as shown and providing a seat within its reentrant angle for the ring 109, and, in turn, seated on a shoulder 111 provided therefor on the piston rod 13 at the axially outer end of a sealing structure accommodating peripheral recess. Between the inner end of the retaining ring 110 within a space provided between the inside diameter of the packing ring 109 and the adjacent recessed perimeter of the piston rod, a plurality of coactive packing rings 112 back up a relatively flexible inner peripheral annular sealing flange 113 on the sealing ring 107. This flexible flange enables the inner perimeter portion of the sealing member 107 to be assembled into the seal-recess area of the piston rod 13 by elastically stretching the flange over the normal or full diameter of the piston rod during assembly of the seal structure on the piston rod. By virtue of the thorough sealing back-up afforded for the flange 113 and supplemental sealing effected by the packing rings 112, quite thorough static sealing against leakage of hydraulic fluid past the piston rod 13 is assured.

While the packing ring 109 affords a static compression back-up for the sealing ring 107, a dynamic wear compensating take-up compression ring 114 of substantially the same inside diameter as the packing ring 109 has a complementary engagement and compression face on its axially outer end thrusting against the axially inwardly facing oblique side of the sealing ring 107. It will be observed that both of the packing rings 109 and 114 are continuous annuli.

Uniform, resilient take-up compression force is exerted axially on the compression packing ring 114 toward the sealing ring 107 by means desirably comprising an annular series of uniformly closely spaced coiled compression springs 115 thrusting against the axially inner side of the ring 114 and seated in respective axially outwardly opening sockets 117 in a combination split ring retainer and bearing bushing 118 (FIGS. 4 and 6) which seats against the axially outer face of and supplements the bearing 104. Positive retention of the bushing 118 in spaced relation to the packing ring 114 and in piston rod bearing support association with the bearing 104 is assured by a shoulder 119 on the piston rod opposing the axially outer end of the bushing.

Figure 6:
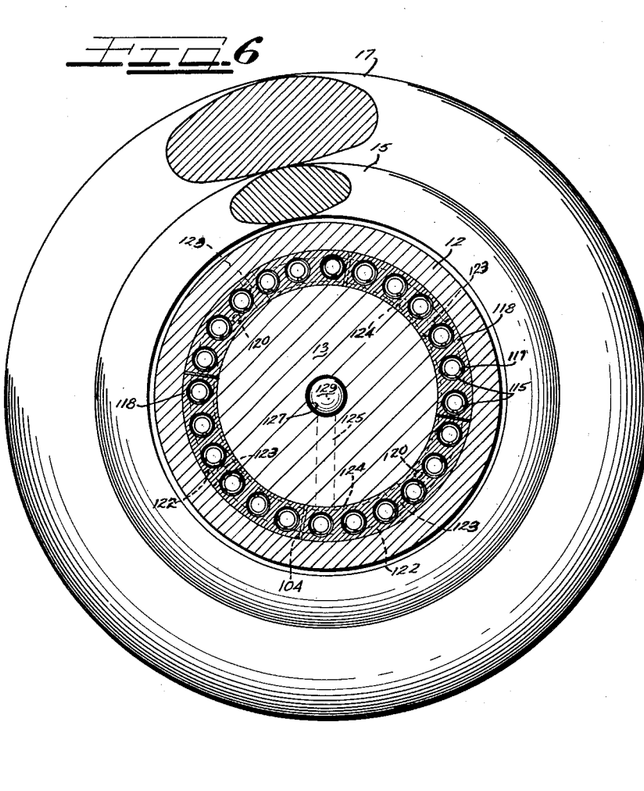
FIGURE 6 is a transverse sectional elevational view taken substantially on the line VI—VI of FIGURE 4.
Figure 8:
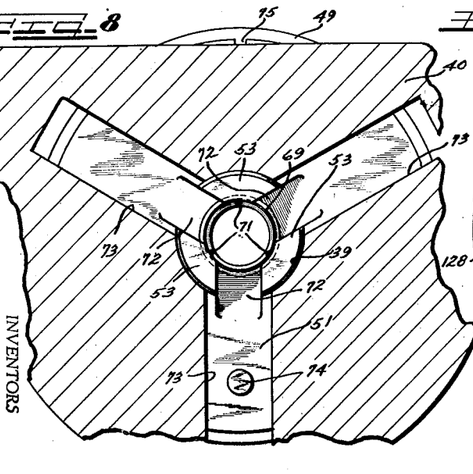
FIGURE 8 is a transverse sectional detail view taken substantially on the line VIII—VIII of FIGURE 3.

Assembly of the bushing 118 snugly about the piston rod 13 within the reduced diameter area of the piston rod to accommodate the bushing is facilitated by constructing the bushing in a plurality of equal segments, such as two, as shown in FIGURE 6, which can easily be accomplished by making the bushing in one piece and then severing it. For the same purpose, the bearing 104 may be split, as for example into two segments. Then, to orient the segments of the bearing 104 and the bushing 118 with the respective split joints out of alignment to minimize hydraulic fluid leakage, orientation pins 120 carried by the respective segments of the bushing (FIG. 4) project into respective alignment notches 121 formed in the opposing face of the bearing 104.

During high pressure inward working strokes of the piston 50 the hydraulic fluid flow displacement path area from the metering tube 69 to the reservoir 63 is sufficiently larger than the flow path area out of the distal or piston rod end of the metering tube into the interior chamber 87 in the piston rod and thence through the working piston passages 88 and 89 into the chamber area back of the working piston to insure that no excessively high pressure reaches the chamber area back of the piston to interfere with the buffing strength of the inward pressure stroke or to impose any such high pressure on the external seal structure including the sealing ring member 107. Desirably the flow between the reservoir end and the piston rod end of the metering tube 69 is divided in a ratio of approximately 3 to 1 for this purpose. This achieves a pressure drop behind the working piston on the closing stroke substantially equal to that from the interior of the metering tube into the reservoir and avoids build up of pressure on the piston rod seal during its closing action. Any pressure surges that may travel back of the piston assembly 50 toward the seal 107 are substantially restrained and prevented from adversely affecting the seal, by the bearing 104 and the bearing bushing 118, together, serving as a high pressure barrier.

Moreover, during return stroke damping action wherein a low order of pressure is developed in the chamber space back of the working piston 50, as compared with the pressures developed in the working cylinder during the inward damping stroke of the working piston, not only does the bearing 104 with the bearing bushing 118 function to prevent pressure from reaching the seal 107, but pressure relief is afforded from the area between the bearing and the seal. For this purpose, a hydraulic fluid drain-off passageway is afforded from the area at the inner side of the seal member 107 and between the packing ring 114 and the piston rod 13 rearwardly of the bushing 118, through the plurality of separations in the bushing 118, an external annular drain groove 122 in the bushing, respective radial bores 123 in the bushing segments and by way of an annular internal groove 124 in the bushing into an aligned radial passage bore 125 in the piston rod 13 communicating with a central blind end reduced diameter terminal counterbore 127 leading axially from the inner end of a stepped counterbore portion 128 at the inner terminus of the central passage bore 87 of the piston rod 13. During inward pressure strokes of the working piston, the passage counterbore 127 is closed by a check valve in the form of a ball 129 seating on a valve seat 130 at the inner end juncture of the counterbore portion 128 with the counterbore portion 127. During the return stroke movements of the piston pressure relief and hydraulic fluid drainage from the seal through the drainage passageway system is enabled by unseating of the ball valve 129 which is retained adjacent to its seat during such unseating movement by a suitable retaining pin 131 extending across the counterbore portion 128.

From the foregoing it will be appreciated that the described hydraulic buffer affords highly effective working stroke metered damping, accommodating exceptionally high working loads without undue stress on any of the parts, with efficient flow characteristics both on inward working stroke and during return damping stroke.

During the normally fully extended condition of the buffer unit the piston rod bearing and seal structure is fully protected from external dirt and other contaminants by the protectively surrounding outer or extension cylinder 12.

Exceptional resistance to and protection from buckling forces encountered in service is afforded by the substantial axial distance between the bearing afforded by the piston head 77 and the bearing 104, 118 on the piston rod.

Since the working cylinder 49 is entirely free from holes or notches it is capable of withstanding high working stresses throughout its working length.

In respect to the metering tube 69, the small number and small individual size of the metering holes 68 assures that they will have a relatively minor effect on the structural integrity of the metering tube, and no weakening effect for the present purpose since this tubular member is only subject to compression forces in operation.

High accuracy machining of working surfaces is greatly minimized as discussed hereinbefore and as is obvious.

It will be understood that modifications and variations may be effected without departing from the scope of the novel concepts of the present invention.

We claim as our invention:

1. In a hydraulic buffer construction including a housing providing a reservoir therein and having a head portion and an opposite opening,
   a working cylinder having one end mounted on said head portion and the opposite end located adjacent to said opening,
   an extension cylinder having means thereon to secure it to said housing and in closing relation to said opening,
   an end portion of the extension cylinder being telescopically supportingly disposed within the end portion of the working cylinder adjacent to said opening,
   and a working piston in bearing relation within said working cylinder between said head portion and the telescoped end of said extension cylinder,
   said working piston having a piston rod of smaller diameter than said extension cylinder projecting through and beyond the extension cylinder and provided with a supporting bearing slidably engaging within the bore of the extension cylinder substantially spaced from said working cylinder,
   the telescopic disposition of said end portion of the extension cylinder in the working cylinder assuring concentricity of the working cylinder and the extension cylinder.

2. In a hydraulic buffer construction including a housing providing a reservoir therein and having a head portion and an opposite opening,
   a working cylinder having one end mounted on said head portion and the opposite end located adjacent to said opening,
   an extension cylinder having means thereon to secure it to said housing and in closing relation to said opening,
   an end portion of the extension cylinder being telescopically supportingly disposed within the end portion of the working cylinder adjacent to said opening,
   a working piston in bearing relation within said working cylinder between said head portion and the telescoped end of said extension cylinder,
   said working piston having a piston rod of smaller diameter than said extension cylinder projecting through and beyond the extension cylinder and provided with a supporting bearing slidably engaging within the bore of the extension cylinder substantially spaced from said working cylinder,
   a follower on the end of the piston rod remote from the piston,
   and shock absorbing and return spring means located externally and alongside said extension cylinder and thrusting against said follower and against said means for attaching the extension cylinder to the housing.

3. In a hydraulic buffer construction including a housing providing a reservoir therein and having a head portion and an opposite opening,
   a working cylinder having one end mounted on said head portion and the opposite end located adjacent to said opening,
   an extension cylinder having an end portion telescopically concentrically supportingly disposed within the end portion of the working cylinder adjacent to said opening,
   an attachment ring flange member engaged about and fixedly secured externally onto said extension cylinder adjacent to said telescoped end portion and secured to the housing in closing relation to said opening and providing a thrust abutment for the telescoped end portion of the working cylinder,
   and a working piston in bearing relation within said working cylinder between said head portion and the telescoped end of said extension cylinder,
   said working piston having a piston rod of smaller diameter than said extension cylinder projecting through and beyond the extension cylinder and provided with a supporting bearing slidably engaging within the bore of the extension cylinder substantially spaced from said working cylinder.

4. In a hydraulic buffer construction including a housing providing a reservoir therein and having a head portion and an opposite opening,
   a working cylinder having one end mounted on said head portion and the opposite end located adjacent to said opening,
   an extension cylinder having an end portion telescopically concentrically supportingly disposed within the end portion of the working cylinder adjacent to said opening,
   an attachment ring flange member engaged about and fixedly secured externally onto said extension cylinder adjacent to said telescoped end portion and secured to the housing in closing relation to said opening and providing a thrust abutment for the telescoped end portion of the working cylinder,
   a working piston in bearing relation within said working cylinder between said head portion and the telescoped end of said extension cylinder,
   said working piston having a piston rod of smaller diameter than said extension cylinder projecting through and beyond the extension cylinder and provided with a supporting bearing slidably engaging within the bore of the extension cylinder substantially spaced from said working cylinder,
   a follower on the end of the piston rod remote from the piston,
   and shock absorbing and return spring means located externally and alongside said extension cylinder and thrusting against said follower and against said attachment flange.

5. In a hydraulic buffer construction including a housing having a reservoir space therein and a head portion at one end of said reservoir space,
   a tubular cylinder,
   means mounting one end of the tubular cylinder on said head portion and including a portion concentrically telescoped within said end of the cylinder,
   a peripheral air vent and metering groove extending axially in the perimeter of said telescoping portion and communicating the interior of the cylinder with the reservoir,
   said telescoping portion having an annular piston ring groove which intersects said axial groove,
   a piston ring in said annular groove having spaced ends,
   and a pin carried by said telescoping portion and aligned with said axial groove and orienting the space between said end portions of the piston ring with said axial groove.

6. In a hydraulic buffer construction including a housing having a working cylinder therein and opening from one end of the housing,
   the housing having a reservoir space externally of said working cylinder,
   a metering tube mounted at one end with the opposite end of the housing and being disposed concentrically within the working cylinder,
   passage means effecting communication between the mounted end of the tube and said reservoir,
   a piston rod projecting from said one end of the housing and having an end portion projecting into the working cylinder,
   said end portion of the piston rod having a clearance bore receptive of said metering tube, and a piston assembly mounted on said end portion of the piston rod and including:
- a centrally bored piston head to clear the metering tube therethrough,
- a clamping and metering flange member having a bore slidably engaging the metering tube,
- and a plurality of screws extending through the flange member and the piston head and threaded into said end portion of the piston rod and thereby securing the flange member clampingly against the piston head and to the piston rod.

7. In a hydraulic buffer construction including a housing having a working cylinder therein and opening from one end of the housing,
- the housing having a reservoir space externally of said working cylinder,
- a metering tube mounted at one end with the opposite end of the housing and being disposed concentrically within the working cylinder,
- passage means effecting communication between the mounted end of the tube and said reservoir,
- a piston rod projecting from said one end of the housing and having an end portion projecting into the working cylinder,
- said end portion of the piston rod having a clearance bore receptive of said metering tube,
- and a piston assembly mounted on said end portion of the piston rod and including:
  - a centrally bored piston head to clear the metering tube therethrough,
  - a clamping and metering flange member having a bore slidably engaging the metering tube,
  - a plurality of screws securing the flange member clampingly against the piston head and to the piston rod,
  - said piston head having fluid passageway communicating between the bore thereof and the face of the piston head against which the clamping member is engaged,
  - and disk ring check valve means controlling said passage and retained within a range of movement by said member.

8. In a hydraulic buffer construction including a housing having a working cylinder therein and opening from one end of the housing,
- the housing having a reservoir space externally of said working cylinder,
- a metering tube mounted at one end with the opposite end of the housing and being disposed concentrically within the working cylinder,
- passage means effecting communication between the mounted end of the tube and said reservoir,
- a piston rod projecting from said one end of the housing and having an end portion projecting into the working cylinder,
- said end portion of the piston rod having a clearance bore receptive of said metering tube,
- and a piston assembly mounted on said end portion of the piston rod and including:
  - a centrally bored piston head to clear the metering tube therethrough,
  - a clamping and metering flange member having a bore slidably engaging the metering tube,
  - a plurality of screws securing the flange member clampingly against the piston head and to the piston rod,
  - said piston head having a plurality of passages from its bore opening through the front face of the piston head and having metering orifice passages opening through the back face of the piston head,
  - and check valve members operatively mounted on the front and back faces of the head member to control respectively said passages and said metering orifices.

9. In a hydraulic buffer construction including a housing having a working cylinder therein and opening from one end of the housing,
- the housing having a reservoir space externally of said working cylinder,
- a metering tube mounted at one end with the opposite end of the housing and being disposed concentrically within the working cylinder,
- passage means effecting communication between the mounted end of the tube and said reservoir,
- a piston rod projecting from said one end of the housing and having an end portion projecting into the working cylinder,
- said end portion of the piston rod having a clearance bore receptive of said metering tube,
- and a piston assembly mounted on said end portion of the piston rod and including:
  - a centrally bored piston head to clear the metering tube therethrough,
  - a clamping and metering flange member having a bore slidably engaging the metering tube,
  - and a plurality of screws securing the flange member clampingly against the piston head and to the piston rod,
  - said piston head having fluid metering passages therethrough from said piston rod bore to the back of the piston head for displacement of hydraulic fluid from said piston rod bore to the back of the piston during an inward stroke of the piston rod and piston,
  - the ratio of flow area of said passage means communicating between the metering tube and the reservoir and said metering passages through the piston head being such as to achieve substantially equal pressure drop from the interior of the metering tube to the reservoir and from the metering passages to the back of the piston during inward working stroke of the piston.

10. In a hydraulic buffer construction including a housing having a cylinder and a piston operative therein with a piston rod projecting substantially beyond one end of the housing,
- a cylinder extension about a substantial portion of the piston rod in spaced relation and defining a return stroke buffer chamber back of the piston,
- an elongated metering member fixedly concentric within the cylinder,
- the piston rod having a bore therein opening through the piston and accommodating said metering member for metering hydraulic fluid from the cylinder in front of the piston into said bore,
- means metering hydraulic fluid from said bore into said buffer chamber back of the piston during a pressure working stroke of the piston and piston rod in the cylinder and cylinder extension,
- means restraining return of hydraulic fluid from said buffer chamber during return strokes of the piston and piston rod so as to afford return stroke resistance pressure to the piston,
- a bearing on and moving with the piston rod spaced from the back of the piston and engaging slidably in the cylinder extension and providing a closure for said buffer chamber,
- sealing means on the piston rod associated with the outer end of the bearing to prevent escape of hydraulic fluid that may leak past the bearing due to said return stroke resistance pressure,
- and pressure relief passageway from the sealing means through the piston rod into said bore for draining the hydraulic fluid leakage from said sealing means during return strokes of the piston and piston rod.

11. A hydraulic buffer adapted to be connected between a pair of relatively movable members.
- comprising a reservoir,
- an imperforate working cylinder defining a working chamber therein.

a cylinder head affording metered communication with said reservoir, an extension cylinder having an internal diameter smaller than the internal diameter of the working cylinder and extending concentrically therefrom opposite to said cylinder head, a piston in said working cylinder and having a rod attached thereto and extending therefrom and beyond the extension cylinder, said rod being of smaller diameter than said internal diameter of the extension cylinder and carrying adjacent to the outer end of the extension cylinder in the extended position of the rod a bearing and a seal in low pressure sliding sealing engagement with said extension cylinder and defining with said cylinder extension and the rod side of the piston and the piston rod a hydraulic fluid chamber space into which fluid is metered through said piston from the working chamber during inward compression strokes of the piston, metering means mounted on said cylinder head coacting with the piston and variable with piston position for metering fluid from said working chamber through the piston and to the reservoir in response to inward compression movement of the piston and piston rod, and means for metering fluid from said chamber space through the piston into said working chamber during outward extension movement of the piston and piston rod.

12. In a hydraulic buffer construction including a housing providing a reservoir therein closed by a head portion at one end and having an opening at an opposite end, a working cylinder having one end mounted on said head portion and an opposite end located adjacent to but spaced from said opening, the housing defining a cylindrical bore of larger diameter than the outside diameter of the working cylinder beyond said opposite end of the cylinder, a tubular extension cylinder having an inner end portion telescopically engaged within said opposite end of the working cylinder in concentricity maintaining relation, a flange abutting the end of the housing adjacent to said bore and having a portion fitting into said bore and thrusting against said opposite end of the cylinder, said flange securing said extension cylinder in place and closing said reservoir opening, means securing said flange to said housing end, a working piston in bearing relation within said working cylinder between said head portion and the inner end of said extension cylinder, a piston rod extending from said piston through and beyond said extension cylinder and of substantially smaller diameter than the inner diameter of the extension cylinder whereby to afford a return stroke buffer chamber, means carried by the piston rod providing a bearing and buffer chamber seal for the outer end portion of the return stroke buffer chamber, the inner end portion of the return stroke buffer chamber opening into the cylinder behind the piston, and means for controlled communication through the piston between the cylinder in front of the piston and said return stroke buffer chamber.

13. In a hydraulic buffer construction including a housing providing a reservoir therein closed by a head portion at one end and having an opening at an opposite end, a working cylinder having one end mounted on said head portion and an opposite end located adjacent to but spaced from said opening, the housing defining a cylindrical bore of larger diameter than the outside diameter of the working cylinder beyond said opposite end of the cylinder, a tubular extension cylinder having an inner end portion telescopically engaged within said opposite end of the working cylinder in concentricity maintaining relation, a flange abutting the end of the housing adjacent to said bore and having a portion fitting into said bore and thrusting against said opposite end of the cylinder, said flange securing said extension cylinder in place and closing said reservoir opening, means securing said flange to said housing end, a working piston in bearing relation within said working cylinder between said head portion and the inner end of said extension cylinder, a piston rod extending from said piston through and beyond said extension cylinder and of substantially smaller diameter than the inner diameter of the extension cylinder whereby to afford a return stroke buffer chamber, means carried by the piston rod providing a bearing and buffer chamber seal for the outer end portion of the return stroke buffer chamber, the inner end portion of the return stroke buffer chamber opening into the cylinder behind the piston, means for controlled communication through the piston between the cylinder in front of the piston and said return stroke buffer chamber, lateral flange means on the end portion of the piston rod beyond the outer end of the extension cylinder, and shock absorbing and return spring means extending about the extension cylinder and thrusting at one end against said lateral flange means and at the opposite end against said flange which abuts the housing end for normally maintaining the piston rod extended and the piston adjacent said inner end of the extension cylinder and during inward working stroke of the piston supplementing said securing means by increasing thrust against said flange whereby to compensate for hydraulic pressure forces within the housing working toward said flange during such working stroke.

14. A hydraulic buffer adapted to be connected between a pair of relatively movable members and wherein the buffer is normally in an extended condition ready for compression stroke resistance to movement of the movable members toward one another and comprising, a working cylinder, means at one end of the working cylinder for thrusting opposition to one of the movable members, a piston in said working cylinder and having a piston rod projecting to a substantial extent beyond the working cylinder and having means on its outer end to thrustingly oppose the other of the movable members, means normally biasing the piston rod relative to the working cylinder to maintain an extended relationship of the piston rod and to maintain the piston in the end of the working cylinder nearest the piston rod, means defining a shoulder to stop the piston within the working cylinder in the fully extended position of the piston rod, an extension from the cylinder beyond said shoulder means and concentrically surrounding the piston rod, the piston rod projecting beyond the distal end of said extension a sufficient distance to permit full inward compression thrust movement of the piston while the outer end portion of the piston rod remains free from the extension, the inner surface of the extension providing a cylindrical surface, and annular bearing means and fluid sealing means on the piston rod located to engage said cylindrical surface adjacent to the distal end of the extension in the fully extended position of the piston rod and thereby sealing said cylindrical surface against entry of dirt or contaminants, the length of said cylindrical surface beyond said shoulder means being related to the full stroke range of the piston in the working cylinder to permit full range of working stroke of the piston, said extension being of smaller outside diameter than, and being concentrically disposed at its inner end portion within, the adjacent end portion of the working cylinder and the inner end of the extension providing said shoulder means.

15. A hydraulic buffer which undergoes lengthwise contraction in response to loading comprising:
   a cylinder having a head substantially enclosing its front end, and an open rear end;
   an assembly comprising:
      a piston reciprocable in said cylinder, and a piston rod for the piston extending rearwardly of said open cylinder;
   a cylinder extension joining with the cylinder at said open end and extending in coaxial relation with the rod and the cylinder rearwardly from the cylinder;
   annular sealing means disposed between the rod and the inner surface of the extension and carried by the rod lengthwise of the extension in fixed longitudinal relation preventing the transmission of fluid from a space adjacent the forward side thereof to a region adjacent the rear side thereof;
   a reservoir connected with said cylinder for the transfer of liquid from one to the other; and
   means for conducting liquid between said space and a liquid storage region comprising the cylinder and the reservoir.

16. A hydraulic buffer which undergoes lengthwise contraction in response to loading comprising:
   a cylinder having an open rear end and a head substantially enclosing its front end;
   an assembly comprising:
      a piston reciprocable in said cylinder, and a piston rod for the piston extending rearwardly of said open cylinder end;
   a cylinder extension joining with the cylinder at said open end and extending in coaxial relation with the rod and the cylinder rearwardly from the cylinder;
   annular means disposed between the outer surface of the rod and the inner surface of the extension in fluid-sealing relation with both the rod and said inner surface for sealing a space forwardly of the annular means with respect to a region rearwardly thereof;
   a reservoir and liquid metering means connecting the reservoir with said cylinder for the transfer of liquid from one to the other; and
   means for conducting liquid between said space and a liquid storage region comprising the cylinder and reservoir.

17. The hydraulic buffer of claim 16 wherein: said cylinder extension has a smaller internal diameter than that of the cylinder.

18. The hydraulic buffer of claim 16 wherein: said cylinder extension has a smaller internal diameter than that of said cylinder; and said sealing means is carried by the piston rod in fixed longitudinal relation therewith.

19. The hydraulic buffer of claim 16 wherein: said cylinder extension has a smaller internal diameter than that of the cylinder; and said assembly comprises means for metering liquid from said space into the cylinder.

20. The hydraulic buffer of claim 19 comprising: a metering tube fixed to said head for communicating liquid from the cylinder to the reservoir, said assembly having an opening extending rearwardly from the front face of the piston for receiving said tube; and said means for conducting liquid comprising means for metering liquid from said space to said opening.

No references cited.

ARTHUR L. LA POINT, *Primary Examiner.*